Nov. 11, 1952        J. A. OSOL        2,617,378
SELF-ADJUSTING AND LOCKING RAT GUARD FOR MOORING LINES
Filed Dec. 27, 1950        2 SHEETS—SHEET 1
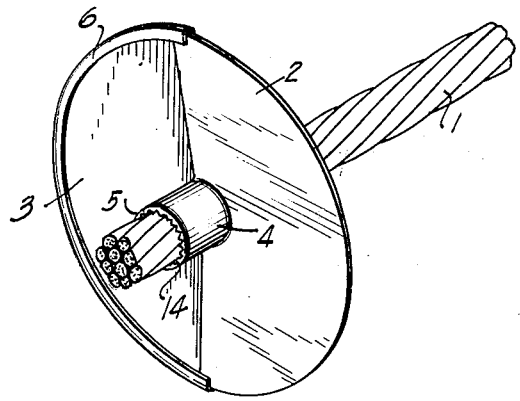
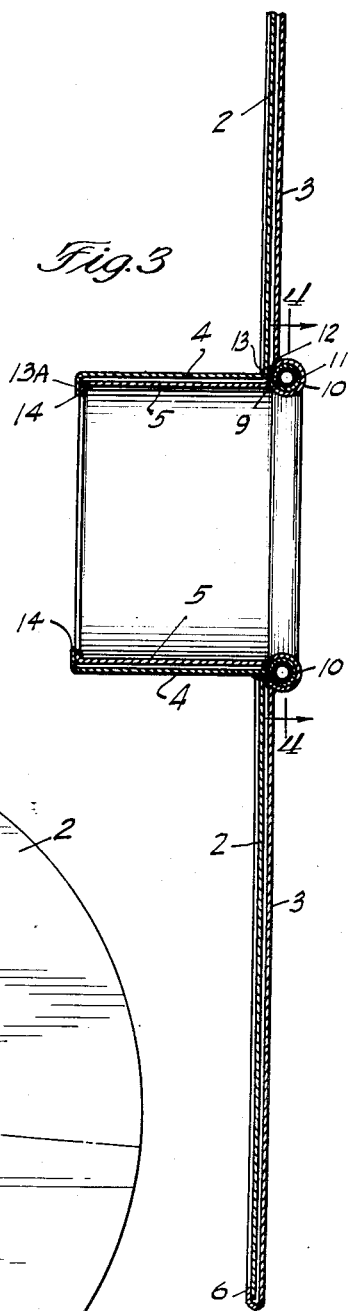
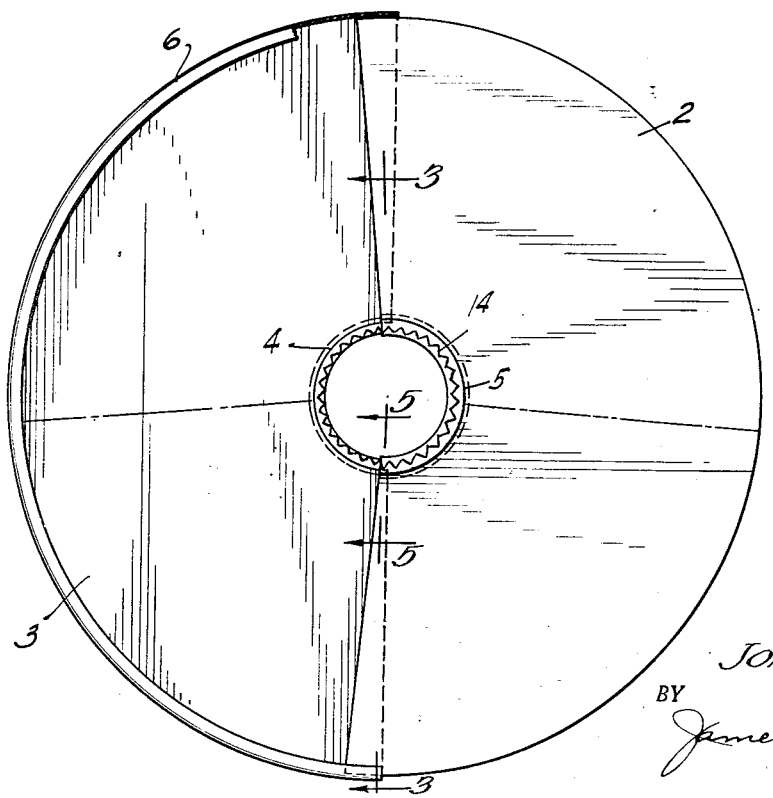
INVENTOR.
John A. Osol
BY
James D. Girnau
ATTORNEY Nov. 11, 1952          J. A. OSOL          2,617,378
SELF-ADJUSTING AND LOCKING RAT GUARD FOR MOORING LINES
Filed Dec. 27, 1950          2 SHEETS—SHEET 2
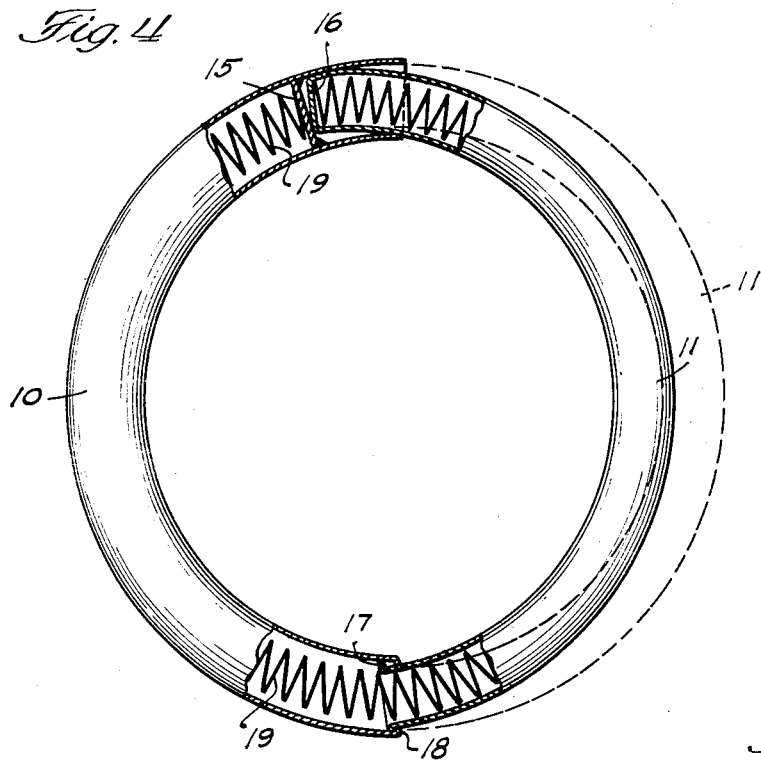
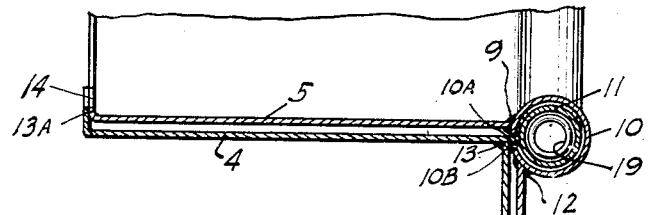
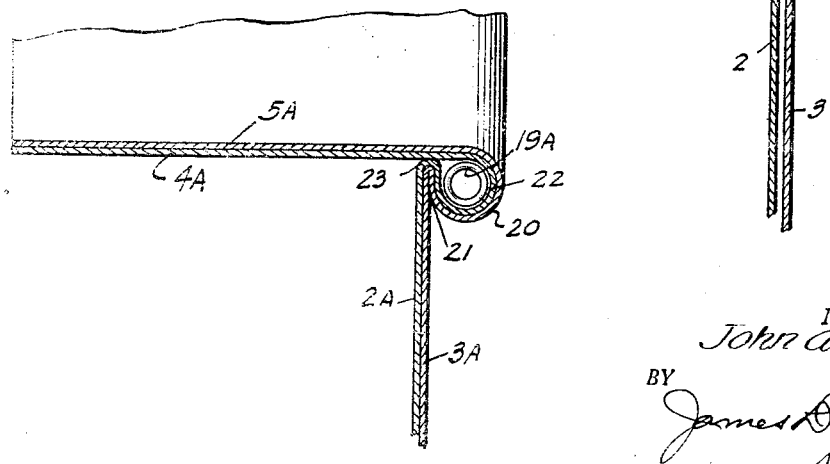
INVENTOR.
John A. Osol
BY James D. Girouard
ATTORNEY Patented Nov. 11, 1952

2,617,378

UNITED STATES PATENT OFFICE 2,617,378

SELF-ADJUSTING AND LOCKING RAT GUARD FOR MOORING LINES

John A. Osol, Portland, Oreg.

Application December 27, 1950, Serial No. 202,947

1 Claim. (Cl. 114—221)

This invention relates to improvements in rat guards for mooring lines for ships.

Heretofore guards of this character have been made of two matching semi-circular discs each formed integral with co-operating hub portions to form a sleeve intended to embrace a line and to be lashed thereto for maintaining the guard in a desired location on the line. In some instances, due to carelessness on the part of the operator in not properly securing the guard to the line, or due to strong winds the guard will open up and fall away from the line or slip away from its location on the line.

Accordingly, it is one of the principal objects of my invention to overcome these objectionable features by providing a guard in which the two semi-circular discs and the hub portions carried thereby will be forced to rotate automatically with respect to each other into a closed position whereby the hub portion will assume a diameter substantially equal to the diameter of the line and also wherein barbs carried by or formed on the interior of the hub portions will automatically engage themselves with the periphery of the line to prevent the guard from slipping in either direction or opening up and falling off the line.

A further object is the provision of two cooperating semi-circular plates which will rotate toward each other to partially embrace a line lying close to the side of a ship and whereby the edges of said plates will conform to and bear against the side of the ship to set up a barrier across the line even though the plates are prevented from rotating into a position where they form a complete circle.

These and other objects will appear as my invention is more fully hereinafter described in the following specification, illustrated in the accompanying drawings and finally pointed out in the appended claim.

In the drawings:

Figure 1 is a perspective view of a guard made in accordance with my invention and shown attached to a fragment of a line.

Figure 2 is an enlarged front elevation of Figure 1 with a fragment broken away for convenience of illustration.

Figure 3 is an enlarged sectional end elevation taken approximately along the line 3—3 of Figure 2.

Figure 4 is an enlarged sectional elevation taken approximately along the line 4—4 of Figure 3 and illustrating a pair of telescoping tubes of semi-circular formation.

Figure 5 is an enlarged sectional detail view taken approximately along the line 5—5 of Figure 2.

Figure 6 is a view similar to Figure 5 illustrating a modification of the invention.

Referring now more particularly to the drawings:

In Figure 1 reference numeral 1 indicates a line of any desired length and secured at one of its ends to a ship and at its opposite end to a wharf, dock or other place of anchorage for the ship. The rat guard consists of a pair of semi-circular plates indicated at 2 and 3 each being provided with semi-cylindrical hub portions 4 and 5 respectively and adapted to form a cylinder for snugly surrounding the line 1 when in the position shown in Figure 1. The marginal edge of the semi-circular plate 3 is turned back on itself to form a track or retaining flange 6 to receive the plate 2 as the two plates are rotated with respect to each other and to retain the plates in proper parallel working relation to each other in an open position, closed position or any position within their operative range with respect to each other. The semi-circular cylindrical portion 4 is formed on a radius slightly greater than that on which its companion semi-cylindrical portion 5 is formed and which is secured as at 9 to an outside semi-circular hollow tube 10. Within this hollow tube is telescoped and slidably mounted a companion tube 11 to which the semi-cylindrical hub portion 4 is secured as at 10A by extending through a slot 10B formed in the tube 10. (See Fig. 5.) The plate 3 is secured as at 12 to the outside tube 10 and the plate 2 is secured as at 13 to the semi-cylindrical hub portion 4. By this arrangement the inner tube 11 may rotate freely within the tube 10, the semi-cylindrical hub forming portions may rotate freely with respect to each other as may also the plates 2 and 3 from an open position to be placed over the line into a closed position to entirely surround and grip the same. The outside edges of both semi-cylindrical hub portions are flanged inwardly as at 13A and the inner periphery of each flange is formed with inwardly projecting teeth 14 for gripping the line as shown in Figure 1.

As best illustrated in Figure 4 the tube 10 is closed near one of its ends by an abutment 15 and the corresponding end of the tube 11 is closed as at 16. The opposite ends of the tubes are in open communication with each other and flanged as at 17 and 18 to provide limit stops to prevent said ends of the tubes from becoming disconnected at any time throughout their operative range while adjusting themselves to the diameter of the line to which the guard is applied. Extending through both of said tubes is a tension spring 19 whose one end is secured to the abutment 15 within the tube 10 and whose opposite end is secured to the closed end 16 of the tube 11. By this arrangement the spring will normally draw the two telescopic tubes toward a minimum diameter determined by the diameter of the line to which they are applied and accordingly maintain the tubes and their related hub forming portions in secure attachment to the line. By this arrangement the guard made in accordance with my invention may be quickly and conveniently dropped on to a line and by reason of the spring and telescopic tubes will automatically adjust itself into firm gripping position about the line and lock itself thereto by means of the teeth 14.

In the modification of the invention illustrated in Figure 6 I dispense with separate tubes as shown in the other form of the invention and instead form tubular elements by looping the inner end of the hub forming portion 5A as at 20 then folding it back on itself as at 21 to form one of the semi-circular plates 3A and also by looping the hub forming portion 4A as at 22 then folding it back on itself as at 23 to form the companion semi-circular plate 2A. The turned back portion 23 forms a retaining track for the folded back portion 21 so that the two semi-circular plates will be maintained in proper working relation with respect to each other. A tension spring 19A extends through both of said looped and telescopic portions to function in the same manner as the spring 19 shown and described in connection with the other form of the invention.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A guard of the class described comprising in combination two semi-circular plates rotatable with respect to each other to form a circular disc, means formed on the periphery of one plate for slidably embracing said other plate for maintaining said plates in co-operative engagement with each other, a semi-cylindrical element secured to each of said plates and adapted to cooperate with each other to form a cylindrical hub portion adapted to embrace a line upon rotation of said plates into the formation of a disc, means surrounding said hub member for normally maintaining said hub portions in cylindrical formation and said plates in circular formation, said hub-surrounding means comprising a hollow semi-circular tube secured to one hub portion, a companion hollow semi-circular tube secured to the other hub portion and telescopically mounted within the first mentioned tube, and a spring extending through said tubes and secured to one end of each of said tubes.

JOHN A. OSOL.

REFERENCES CITED

The following references are of record in the file of this patent:

UNITED STATES PATENTS

| Number | Name | Date |
| --- | --- | --- |
| 694,208 | Smith | Feb. 25, 1902 |
| 1,401,540 | Konig | Dec. 27, 1921 |
| 1,486,417 | Cheely | Mar. 11, 1924 |

FOREIGN PATENTS

| Number | Country | Date |
| --- | --- | --- |
| 27,957 | Great Britain | of 1910 |